United States Patent [19]

Weiss et al.

[11] Patent Number: 4,558,315

[45] Date of Patent: Dec. 10, 1985

[54] INPUT APPARATUS AND METHOD FOR CONTROLLING THE SCANNING OF A MULTI-CELL DISPLAY

[75] Inventors: Lawrence H. Weiss, Portland; Akbar Tahayeri, Beaverton, both of Oreg.

[73] Assignee: Zygo Industries, Inc., Portland, Oreg.

[21] Appl. No.: 483,733

[22] Filed: Apr. 11, 1983

[51] Int. Cl.⁴ .............................................. G08B 5/22
[52] U.S. Cl. ................................ 340/802; 340/365 R; 340/365 S; 340/825.19
[58] Field of Search ........... 340/802, 727, 814, 825.19, 340/825.56, 711, 712, 365 R, 365 S, 365 VL; 400/87; 178/17 C

[56] References Cited

U.S. PATENT DOCUMENTS

| | | | |
|---|---|---|---|
| 3,651,512 | 3/1972 | Summers | 340/365 VL |
| 3,798,599 | 3/1974 | Kafafian | 340/825.19 |
| 4,241,521 | 12/1980 | Dufresne | 340/825.19 |
| 4,293,855 | 10/1981 | Perkins | 340/802 |
| 4,458,238 | 7/1984 | Learn | 340/825.19 |

OTHER PUBLICATIONS

Shwedyk and Gordon, "Communication Aid for Non-vocal Handicapped People", Medical & Biomedical Engineering & Computing, Mar. 1977, vol. 15, No. 2.
Nonvocal Communication Techniques and Aids for the Severely Physically Handicapped, University Park Press, 1975; G. C. Vanderheiden et al.
Advertizing Circular, "Model 100 Communication System", Zygo Industries, 1978.
Advertising Circular, "Express Three Communication System", Prentke Romich Company.

Primary Examiner—Gerald L. Brigance
Assistant Examiner—Jeffery A. Brier
Attorney, Agent, or Firm—Chernoff, Vilhauer, McClung, Birdwell & Stenzel

[57] ABSTRACT

An apparatus and method are disclosed for adapting a multi-mode scanning technique employed to optically scan the display panel of a scanned display device to provide for the time required by the user to adjust to a change in scanning mode. Each scanning mode has a predetermined scan transition time during which scan transitions are made. The adaptation consists of lengthening a predetermined number of scan transition times immediately following the beginning of a scanning mode, with the lengthening increment shorter for each successive preselected scan transition time, and with the lengthening occurring automatically in response to a change or beginning of a scanning mode.

15 Claims, 5 Drawing Figures

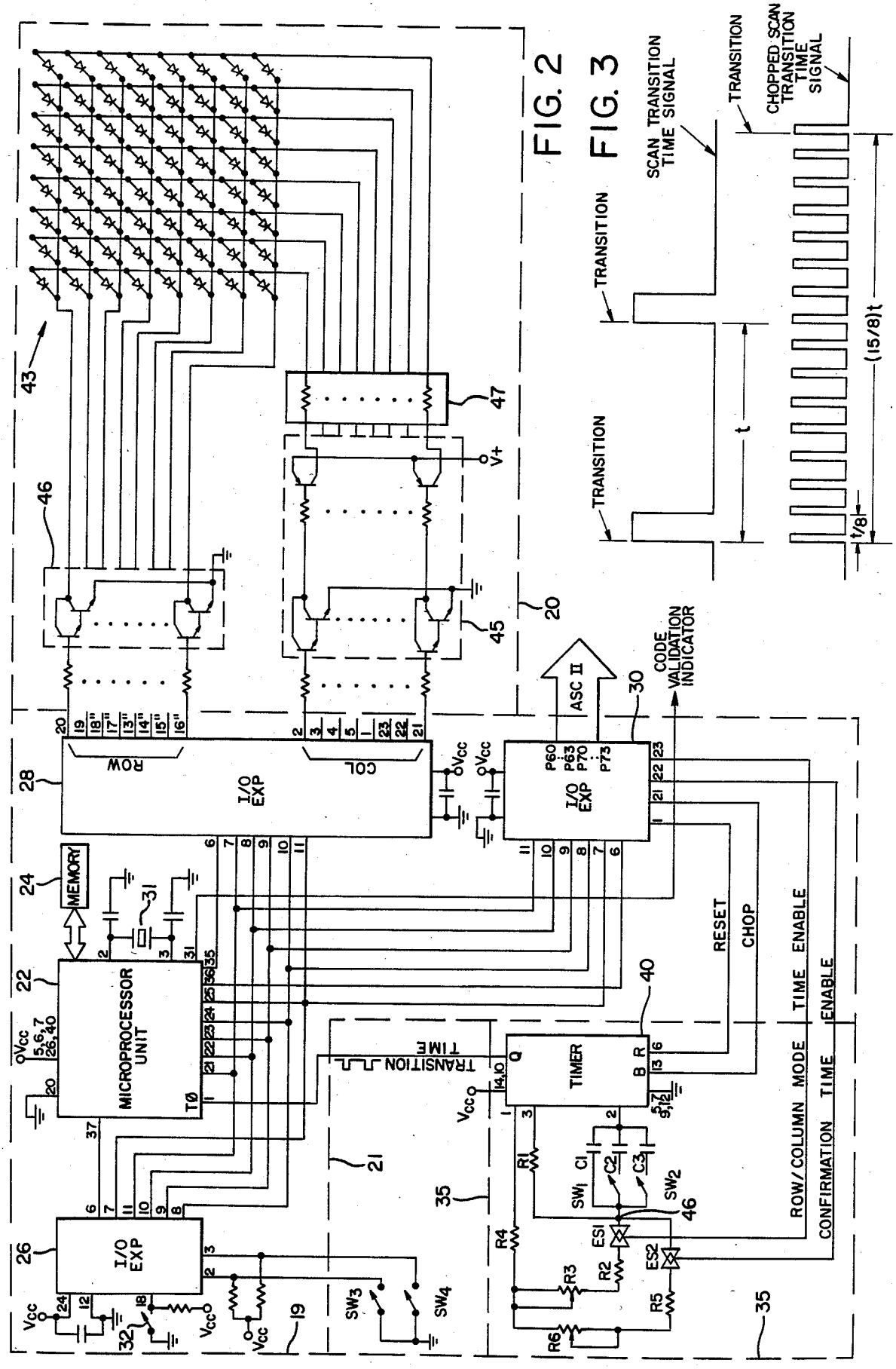

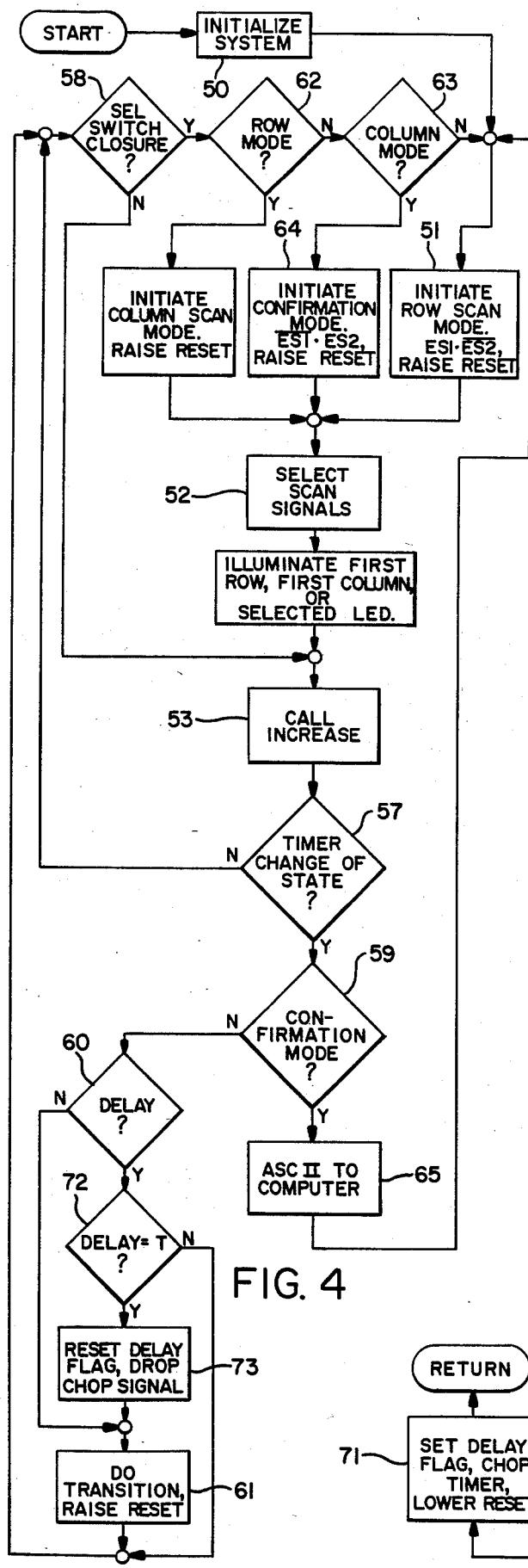
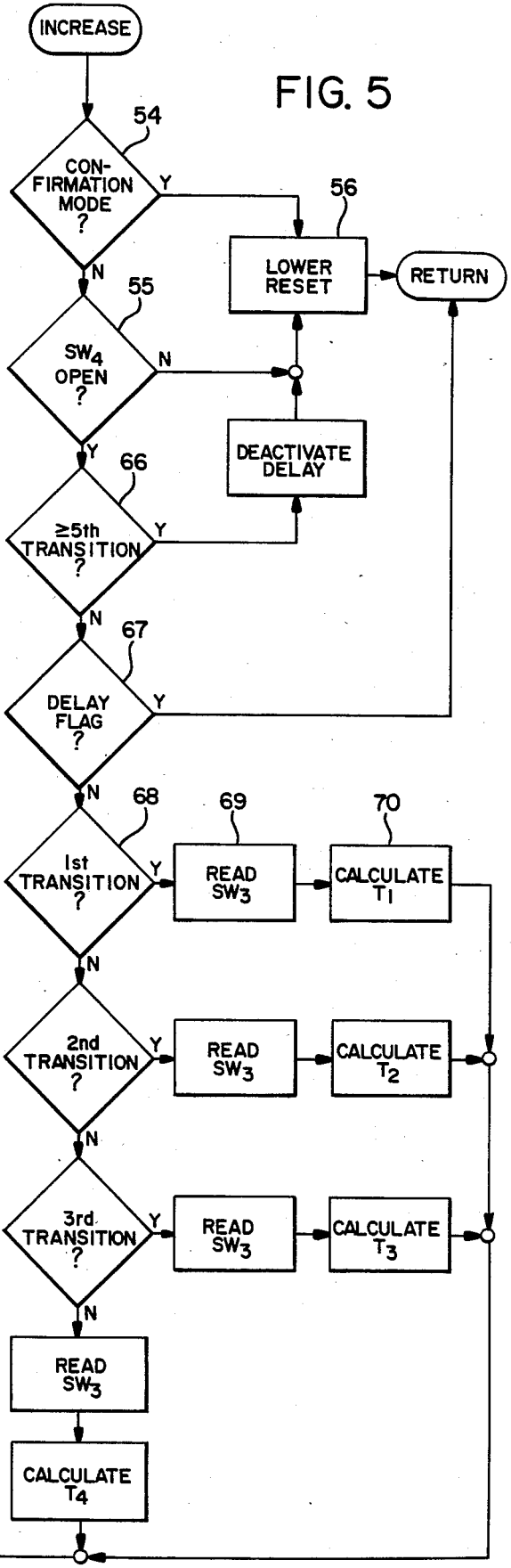
FIG. 4
FIG. 5

INPUT APPARATUS AND METHOD FOR CONTROLLING THE SCANNING OF A MULTI-CELL DISPLAY

BACKGROUND OF THE INVENTION

This invention relates to scanned displays. More specifically it relates to scanned displays such as are used with computer access devices, communications aids, or the like.

The field of devices which provide a user with the ability to access a computer for the purpose of controlling or determining its operation generally includes devices such as keyboards, tape readers, and punched card readers. The field of computer access devices can also include communication aids or other devices having displays made up of a plurality of display cells which are selectable by the user. One area in which communication aids are employed with great effect is that of communicative handicaps. Individuals having severe handicaps such as cerebral palsy, which reduce their abilities to communicate by the usual modes of expression such as speech and writing, must use aids to make their communications intelligible. A class of communication aids for the handicapped comprises an aid which enables a user to communicate by employing any volitional means at his disposal to select from a displayed array of communication elements. Communication aids of this class are described in G. C. Vanderheiden, et al., ed., *Nonvocal Communication Resource Book*, University Park Press, 1978, and in G. C. Vanderheiden, et al., ed. *Nonvocal Communication Techniques and Aids For The Severely Physically Handicapped*, University Park Press, 1975.

One such communication aid includes a display panel divided into a two-dimensional matrix of individual display cells, with each cell containing a character such as a symbol, letter, or numeral. The user communicates by selecting a single cell, or group of cells.

One technique of cell selection provides a visible, mobile indicator which moves from cell to cell, and is stopped by the user when it indicates a cell he wishes to select. An instrument embodying this technique is the Model 100 communication system, manufactured by Zygo Industries, Incorporated, Portland, Ore. In one form of this technique, indication consists of optically activating a cell by producing or intensifying illumination associated with the cell. For example, the cell may be optically activated by illuminating a visible light source, such as a light-emitting diode (hereinafter, LED) which is contained in the cell. The communication aid has circuitry which optically activates the cells in a systematic manner. When a cell which a user wishes to select is activated, he closes a switch to interrupt the activation, which causes the cell's LED to remain illuminated. The systematic activation is resumed either automatically, or manually by another switch closure. This technique of selection is very effective for individuals having healthy cognitive abilities but few volitional actions, because its use depends only upon switch closures which can be accomplished by, for example, the moving of a digit, movement of a limb, eye motion, or an uttered sound.

As is known in the art, a communication aid can be provided with encoding circuitry, which will produce a coded signal corresponding to the character contained in the selected cell. The coding circuitry can be interconnected with a computer system, which includes a printer or display, and which can respond to the coded signals by printing or displaying the character. This enables the user to compile selected characters into verbal communications such as sentences.

It is evident that such a communication aid can be utilized in a more sophisticated manner. For example, appropriate computer control commands can be provided in selected display cells to allow any user, handicapped or not, to write or execute computer programs. In short, the aid can functionally correspond to a manual computer keyboard.

The user of such a device may be assisted in selecting a display cell by the provision of electric circuitry to control and implement the optical activation of an array of display cells according to a scanning technique, a number of which are described in the Vanderheiden, et al., reference cited above. A scanning technique comprises at least one systematic manner or "mode" of scanning which includes a plurality of scan transitions, with each scan transition including the successive activation of at least a related pair of display cells.

In fact, most of the well-known scanning techniques used to activate the display cells of a display panel comprise more than one scanning mode. For example, communication aids which operate by means of multi-mode scanning techniques are known to be provided with electrical control devices, such as switches or "joysticks," which enable the user to change the operation of the aid from one scanning mode to another.

One multi-mode scanning technique known in the art is the row-column scanning technique. The cells of a display panel may be arranged into a regular two-dimensional matrix, whereby they will naturally form rows and columns. In the row-column scanning technique, all of the cells in one row are optically activated simultaneously, and then extinguished simultaneously, while the next row is activated, and so on. In this mode of operation the communication aid is said to be "row scanning", the movement of optical activation from one row to another is termed a "row scan transition," and the time consumed during a row scan transition is called the "row scan transition time." It is most often the case that all of the row scan transition times are equal.

When a row containing the cell which the user wishes to select is activated, he closes the switch to select the row, and, in selecting it, causes the scanning operation to change to a mode wherein individual cells in the selected row are successively optically activated, one at a time. This is called the "column scanning" mode, wherein the movement of optical activation from cell to cell is termed a "column scan transition," the duration of which is termed the "column scan transition time." It is most often the case that the row and column scan transition times are equal.

When, in the column scanning mode, the cell containing the character which the user wishes to select is optically activated, the user closes the switch to select the cell. In what may be termed the "confirmation" mode of operation, scanning ceases while the selected cell remains optically activated. In most scanned displays having this mode, row scanning is automatically resumed after the selected cell has remained optically activated for a period of time.

It is known that both the row and column scanning modes are cyclic, in that, if all rows in the row mode or all cells in the column mode are scanned without the user making a selection, the aid will be rescanned in the respective mode until a selection is made. Thus, should the user, because of inattention or slow reflexes, miss a selection during a first scan cycle, he will have an opportunity to make his selection during a succeeding scan cycle in the then-current scanning mode.

The Applicants have observed that, while the mean time required by an individual user to react to a scan transition and make a selection by switch closure (termed "mean selection reaction time") may shorten with practice, the user's selection reaction time invariably lengthens in reaction to a change in scanning mode. For example, upon selection of a row during the row scanning mode, the mode changes to a column scan, and immediately following the mode change, there is a perceptible time (called "adjustment time" herein), which varies from user to user, during which the user must first adjust his reactive faculties to the change in scanning mode before his instantaneous selection reaction time shortens to equal his mean selection reaction time. The Applicants have observed that the adjustment time has a short persistence and appears to decay over a time period measured from the change in mode. The user's adjustment time may interfere with his ability to react to the first few row or cell transitions with the same speed that he can react to later transitions. The result can be that the user can miss the first opportunity to select a row or cell if it occurs soon after a change of scanning mode. Then, the user has to await a subsequent cycle to make the missed selection, which can reduce his overall communication speed.

Stated differently, there is a measurable time after a change of scanning mode during which the cognitive and reactive faculties of a user adjust to the change. This adjustment time may cause a user to miss the first opportunity to make a selection and force him to await a whole scan cycle before he again has an opportunity to select.

This adjustment time is evidenced also in other multi-mode scanning techniques wherein a change is made in the mode of scanning an array of display cells to assist the user to quickly select a desired cell.

The Applicants have attempted to adapt various multi-mode scanning techniques to account for a user's adjustment time by lengthening the first scan transition occurring after a change in scanning mode. This has not succeeded, possibly because the adjustment time is a complex function related both to a change in scanning mode and to a change in scan transition time. The Applicants have found that this approach does not perceptibly improve the efficiency with which a scanned display is used because a significant number of first selection opportunities are still missed immediately after the abrupt change in scan transition time.

Accordingly, in display devices utilizing a multi-mode scanning technique to select from a plurality of display cells, there exists a need to adapt the technique to account for the time required by the user to adjust to a change in scanning mode so as to increase the possibility that a desired selection can be made immediately after a change in the mode.

SUMMARY OF THE INVENTION

The present invention meets the aforementioned need and overcomes the aforementioned drawbacks of previous scanned displays utilizing multi-mode scanning techniques to activate a plurality of display cells, by controlling the scan transition time so that, automatically in response to initiation or change of a scanning mode, beginning with the first transition after the change, a preselected number of successive scan transition times are increased over a nominal scan transition time, with the increase being smaller for each successive scan transition until the nominal scan transition time is reached, whereafter, every scan transition time is equal to the nominal scan transition time. The Applicants have found that the preselected series of progressively shorter scan transition times overcomes the difficulties associated with adjusting to the change in scanning mode, without introducing added difficulties resulting from an abrupt change in scan transition time.

The invention is directed to a scanned display device having a display activated by a scanning technique, the display including a plurality of display cells and circuitry for activating those cells. A scanning apparatus controls the activation of the display cells according to a plurality of different scanning modes, wherein each scanning mode comprises a plurality of scan transitions, with each scan transition including the successive activation of at least a pair of display cells. The scanning apparatus includes means for initiating a scanning mode. A timing means is also included in the scanning apparatus to establish the scan transition time for each scan transition of each mode and to selectively lengthen the scan transition times occurring after an initiation of a scanning mode, the lengthening taking place automatically in response to the initiation of a scanning mode, and the lengthening becoming shorter over a plurality of successive transitions until a nominal transition time is reached.

The lengthened transition times preferably occur immediately after the initiation of a scanning mode in order to allow the user's faculties time to react to the change in sensory stimulus represented by the initiation of the scanning mode. In this manner, the lengthening of the user's selection reaction time in response to a change in scanning mode can be accommodated in the scanning technique while avoiding the adjustment time resulting from a single, abrupt change in scan transition time.

Accordingly, it is an object of the invention to provide an improved scanned display device.

It is a further object of the invention to provide an improved means and method for scanning the display of a computer access device or a communication aid.

It is a still further object of the invention to provide a means and method for adapting a multi-mode scanning format employed in a scanned display to account for the time required for the user to adjust to a change in, or initiation of, a scanning mode.

The foregoing and other objectives, features, and advantages of the present invention will be more readily understood upon consideration of the following detailed description of the invention taken in conjunction with the accompanying drawings.

DESCRIPTION OF THE DRAWINGS

FIG. 2 is a schematic circuit diagram illustrating the adaptive scanning apparatus of the invention.

FIG. 3 is an illustration of waveforms used in the adaptive scanning apparatus of the invention to establish scan transition times.

FIG. 4 is a schematic program flow chart illustrating the scanning mode control routine used in the invention.

FIG. 5 is a schematic program flow chart showing the increase subroutine used to control the scan transition time of the invention.

DESCRIPTION OF THE PREFERRED EMBODIMENT

Figure 1:
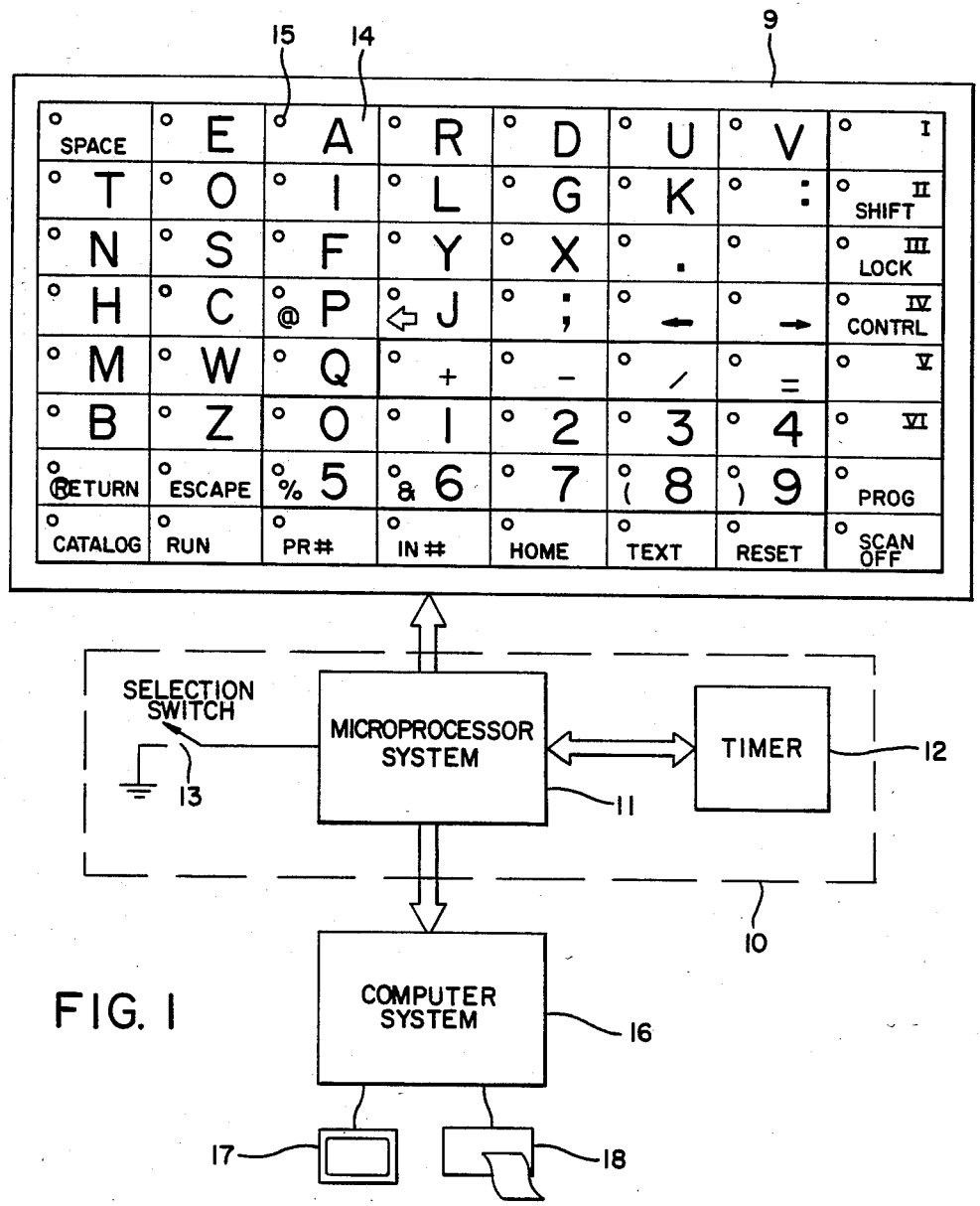
FIG. 1 is a schematic block diagram illustrating a device having scanned visual display panel comprising an array of display cells.

Referring first to FIG. 1, a scanned visual display device such as a communication aid or computer access unit has a display panel 9 for presenting to a user the possible outputs of the device. A scanning control apparatus 10 comprises a microprocessor 11 including a programmed memory and input/output (hereinafter, I/O) circuitry for scanning the display panel 9, a timer circuit 12 connected to provide a scan transition timing signal to the microprocessor system 11, and a selection switch 13 employed by the user to operate the device.

The display panel 9 is divided into a two-dimensional grid comprising rows and columns of rectangular display cells, one of which is indicated by 14. Each display cell contains one communication unit, such as a letter, number, computer keyboard command, or computer system command. Also contained in each display cell is an LED, one of which is shown at 15, which emits in the visible spectrum.

In using the device illustrated in FIG. 1, the user will select a communication element by causing the LED in the display cell containing the desired communication unit to be illuminated. To enable the user to make a selection, the device operates by employing a multimode scanning program, which is entered into the microprocessor system 11, to implement the optical activation of the LEDs on the display panel in a systematic manner which is controlled by the user.

For example, in the well-known row-column scanning technique, the device begins operation in the row scanning mode wherein all the LEDs in the top row of the display panel 9 are turned on for a period of time, after which a row scan transition occurs, whereby the top row of LEDs is extinguished at the same time that the LEDs of the second row of display elements are simultaneously illuminated. A series of row scan transitions ensues until the LEDs of the bottom row are turned on. The row scan mode is cyclical and, when the LEDs of the bottom row of the display panel are extinguished, a row scan transition will be made whereby the LEDs of the top row will once again be simultaneously activated. The rows will continue to be scanned in this manner until the user closes the selection switch 13.

When the LEDs of the row including the display cell containing the communications unit which the user desires to select are illuminated, the user will depress selection switch 13, which will cause the microprocessor circuit 11 to change the scan mode from row scanning to column scanning.

In the column scanning mode, the LEDs in the selected row of display cells are sequentially illuminated. Thus, assuming that the user has selected the third row of display cells from the top which begins with the communications unit N, the LED in the first display cell on the left, containing the N, will be illuminated for a period of time, after which a column scan transition will occur whereby the first LED will be switched off and the LED in the next display cell to the right, which contains S, illuminated, and so on until the LED in the display cell containing the "lock" command is illuminated. As it is usually the case that the column scan format is also cyclic, when the "lock" display cell LED is extinguished, the display cells in the selected row will again be scanned beginning with the display element containing N.

When, in the column scan format, the display cell containing a desired communication unit is optically activated by having its LED turned on, the user closes the selection switch 13 which causes the scanned display device to change operation from the column scanning mode to what may be called the confirmation mode, according to which the LED in the selected display cell can be continuously illuminated or flashed continually to indicate a selection.

It is usually the case that, once the user has made the selection of the desired display cell and the display device has confirmed this selection by entering the confirmation mode, the aid will automatically begin row scanning again so that the user may make another selection.

A computer system 16, having a CRT display 17 or printer 18, is connected to the microprocessor system 11 of the scanning control apparatus 10 to receive appropriately coded signals representative of the communication unit in any selected cell. The code may be, for example, ASCII, and the computer system may be programmed to accept and respond to the code. For example, the computer system may provide a continuous representation, on a display 17 or printer 18, of a succession of alpha numeric communication units selected by the user. In this manner, the device can be used as a communication aid by the handicapped to compose written communications. Alernatively, the device is useful as a computer access unit employable by any user to program or control the operation of the computer system 16.

Communication aids employing row-column scanning to enable a user to access a computer system are well known in the art. An example is the Express 3 Communication System, manufactured by the Prentke Romich Company, Shreve, Ohio, which also includes a computer system for compiling written communications.

As the user becomes adept at manipulating the scanned display, he can increase the speed with which it is scanned by decreasing the scan transition time for each mode. Scanned communication aids having manually adjustable scan transition times are well known, the Express 3 system cited above being one example. As explained hereinabove, the row or column scan transition time is understood to be the time consumed by a single scan transition. The confirmation mode time is the time from the optical activation of the LED in the selected display cell until the activation of the LEDs in the first row of the row scanning mode. It is most often the case that all of the row and column scan transition times are equal and can range from more than 10 seconds for some users to less than 0.10 seconds for others.

As explained above, a user's adjustment time can impair his efficiency of use of a scanned display and may cause the user to miss the first opportunity to select a row or display cell, requiring him to wait until the scan mode begins its second cycle.

A method for adapting the row-column scanning technique to account for the user's adjustment time can be understood with reference to the scanned display device illustrated in FIG. 1 and explained hereinabove, which does not operate according to the mode of the invention. In the preferred mode of performing the method of the invention, the two-dimensional array of display cells on the display panel 9 is scanned by the row-column scanning technique, described hereinabove, wherein, after a selected display cell is optically activated in the confirmation mode, the device automatically resumes row scanning. Both the row and column scanning modes are, preferably, cyclic, as explained above. In the method of the invention, whenever a scanning mode is initiated, that is, when the device is initially turned on and begins scanning in a preselected scanning mode, or when the scanning mode is changed, for example, from the confirmation to the row scanning mode, or from the row to the column scanning mode, a preselected number of scan transition times immediately following the initiation of the scanning mode are lengthened. The durations of the preselected transition times progressively decrease from an initial period of time for the first transition to a relatively shorter period of time for the last, with all transition times thereafter being of constant duration, t, which is less than the duration of any of the preselected transition times.

For example, in the row scanning mode, the first transition of the first cycle may have a transition time, $t+a$, the second may have a transition time, $t+b$, the third may have a transition time, $t+c$, and the fourth and all subsequent transitions may have a constant transition time, t, wherein $a>b>c$, and it is the case that $a<t$. Similarly, the transition times in the column scanning mode may be tapered in the same way from an initial value for the first transition of the first cycle to a relatively shorter, final value. The choice of delay values, a, b, and c, is made according to the needs of a respective user, as is the final scan transition time, t. The delays can be made selectable to accommodate the momentary lengthening of a particular user's selection reaction time in response to an initiation of a scanning mode.

A system embodying the invention is illustrated in detail in FIG. 2. It can be used in the scanned display device of FIG. 1 to adapt a variety of multi-mode scanning techniques to a user's adjustment time. In the preferred embodiment, the system employs the row-column scanning technique and adapts it by systematically lengthening the scan transition times of the first four scan transitions, respectively, of the first cycle after a change to the row or column scan mode.

The system of the invention comprises a scanning control apparatus 19 and a display panel circuit 20. The scanning control apparatus 19 contains the elements necessary to control the optical activation of the display panel circuit 20 according to a selected scanning technique. The display panel circuit 20 contains the means for optically activating the display cells of a display panel corresponding to the display panel of FIG. 1.

The scanning control apparatus 19 of the invention includes a microprocessor system 21, which comprises a microprocessor unit (hereinafter MPU) 22, a memory section 24, which can include random access memories, read-only memories, and associated buffers, interconnected with the MPU 22, and I/O expanders 26, 28 and 30, each of which is connected to the MPU 22 for broadening its I/O capacity. The MPU 22 is provided with a crystal oscillator 31 to establish its speed of operation which, in the preferred embodiment, is approximately 400,000 operations per second.

In the preferred embodiment, the MPU 22 may comprise an 8-bit microprocessor such as the INTEL 8039, or equivalent, which may be configured and programmed as described herein with reference to the MCS48 TM User's Manual, #98-270B, July 1977, published by Intel Corporation, Santa Clara, Calif. Each of the I/O expanders 26, 28, and 30 may comprise, for example, an I/O expander such as the INTEL 8243, or its equivalent.

A selection switch 32 is connected through I/O expander 26 to the MPU 22 for the user to indicate row and cell selections to the MPU. The scanning control apparatus further comprises a scan transition time circuit 35 which includes a programmable timer 40 which can comprise a Motorola MC14541B, or equivalent, connected to provide a scan transition time signal to the MPU 22 on the TRANSITION TIME signal line. The sca transition time signal is a pulsed digital waveform whose frequency is selectable, and which is used by the MPU 22 to effect a transition in a particular scanning mode when the MPU detects a change in state of the signal.

In the preferred embodiment, the circuit voltage, Vcc, is approximately 5 Vdc.

The scan transition signal of the preferred embodiment is illustrated in FIG. 3. In the preferred embodiment, a transition occurs when a rising edge of the signal is detected by the MPU 22, and the scan transition time, t, is equivalent to one cycle of the scan transition signal.

The duration of a cycle of the scan transition time signal is established by the frequency of oscillation of the programmable timer 40; the frequency of oscillation is set by the total RC product appearing between pins 1 and 2 of the timer. The magnitude of capacitance is established by the array of capacitors C1, C2 and C3, all of which are commonly connected on one side to pin 2 of the timer. On their other sides, the capacitors are connected to the node 41, with capacitor C1 being directly connected thereto, and capacitors C2 and C3 being connected to the node through switches SW1 and SW2, respectively. The total amount of capacitance present at pin 2 of the timer 40 is established by the settings of switches SW1 and SW2 which set the total capacitance in parallel with the capacitor C1. The total amount of resistance in the RC circuit is established by electronic switches ES1 and ES2, the states of which are controlled by the MPU 22 through the I/O expander 30 on the lines labelled ROW/COLUMN MODE TIME ENABLE and CONFIRMATION TIME ENABLE, respectively. With the electronic switch ES1 closed (denoted by ES1) and switch ES2 open (denoted by $\overline{ES2}$), the total resistance comprises the series connection of resistor R2, potentiometer R3 and resistor R4. With ES1 open ($\overline{ES1}$), and ES2 closed (ES2), the total resistance includes the series combination of resistor R4, resistor R5, and potentiometer R6. The electronic switches ES1 and ES2 can comprise Motorola MC14066B bidirectional switches, or equivalent circuitry.

The RC network configuration illustrated in FIG. 2 enables the user to select a range of oscillation frequencies of the scan transition signal by selecting a combination of settings of the switches SW1 and SW2. The selection of a series resistance through one of the electronic switches is made by the MPU 22 in the execution of its scanning mode control routing as explained hereinbelow. With the setting ES1.$\overline{ES2}$, the frequency of oscillation of the scan transition signal will be established at a specific value determined by the adjustment of R3, within the range determined by switches SW1 and SW2. In the preferred embodiment, this setting is used to establish the scan transition time for the row and column scanning modes. With the setting $\overline{ES1}.ES2$, which is used to establish the transition time for the confirmation mode, the frequency of oscillation of the scan transition signal is established by the adjustment of R6, within the range determined by switches SW1 and SW2.

The operation of the programmable timer 40 is controlled by the MPU 22 through the I/O expander 30 on the signal lines labeled RESET and CHOP. The programmable timer will be prevented from operating so long as the voltage on RESET line is high; conversely, when the voltage on the RESET line drops to near ground, the timer will begin operation. With the signal voltage on the CHOP line near ground, the programmable timer will operate at a nominal frequency established by the configuration of the RC network between pins 1 and 2. According to the preferred embodiment, when the voltage signal on the CHOP line raises to near the operating voltage of the programmable timer 40, the internal circuitry of the timer will cause the frequency of oscillation to increase to eight times the nominal frequency, as illustrated by the chopped transition time signal waveform in FIG. 3. This accelerated frequency is used by the MPU 22, as described below, to adapt the scan transition time to account for the adjustment time of the user.

The adaptation of the row and column scan transition time by the provision of progressively shorter increases in the first four scan transition times after a change in scan mode, is controlled by the setting of switches SW3 and SW4, which are connected through I/O expander 26 to the MPU 22 and decoded as explained below. The switches SW3 and SW4 are set by the user to select increases of varying duration.

A display panel may be scanned by the systematic activation of the LED matrix 43 which corresponds to the display cell array of the display panel 9 illustrated in FIG. 1. The scanning of the LED matrix is controlled by the MPU 22 through the I/O expander 28. The I/O expander 28, in turn, controls the amplifier circuit arrays 45 and 46, which optically activate the LEDs of the matrix 43. Each output pin of the I/O expander 28 within the group labeled "COL" is connected through a respective transistor circuit in the source amplifier circuit array 45, and a respective resistor in a limiter circuit 47, to the anodes of all diodes within a respective column in the LED matrix 43. Similarly, each pin within the group labelled "ROW" is connected, through a respective transistor circuit of the sink amplifier circuit array 46, to the cathodes of all diodes in a respective row in the LED matrix 43.

The MPU 22 causes the LED array 43 to be scanned according to a scanning mode control routine, explained hereinbelow, which will cause the MPU to produce scanning signals which are carried to the I/O expander 28. The I/O expander 28 decodes the scanning signals to provide control signals for the LED matrix 43 through the current amplifier circuit arrays. The signals cause the matrix to be scanned in the row-column scanning formats described hereinabove.

For example, in the row scanning mode, the MPU 22, will produce a scanning signal which causes the voltage of all of the COL pins of the I/O expander 28 to rise to near V+. In the preferred embodiment, V+ is approximately 12 Vdc. Each transistor circuit in the source amplifier circuit array 45 will be turned on, thereby providing a positive voltage on the anode of each diode in the LED array. Rows of the matrix can then be scanned when the MPU 22 produces a succession of signals, each of which will cause the voltage of a respective output pin of the ROW group of the I/O expander 28 to rise, while keeping the voltages of the remaining ROW pins near ground. When the voltage of a ROW pin rises, the associated transistor circuit in the sink amplifier circuit array 46 will switch on and provide a ground potential to the cathodes of a row of LEDs, thereby forward biasing and optically activating them.

Similarly, the column scan format is implemented when the MPU 22 produces a scanning signal which causes the I/O expander 28 to raise the voltage in the ROW pin connected to a selected row while keeping the voltages of all the other ROW pins at ground. Then, successive scanning signals will cause the voltage of successive COL pins of the I/O expander 28 to be raised, which will forward bias, and thus illuminate, one-by-one, the associated LEDs in the selected row.

During column scanning, a panel location word is assembled by the MPU using the row and column portions of the column scanning signals, with the word being updated with each column scan transition. The location word comprises the row-column coordinates of the currently optically activated display cell.

Finally, to illuminate a selected display element in the confirmation mode, the MPU 22 will simply stop the column scan mode and maintain the scanning signal which it is providing when the user closes the selection switch 32 while the communication aid is in the column scan mode.

At the end of the confirmation mode, the MPU 22 provides, through I/O expander 30, the ASCII code representation of the character contained in the activated display element. This is accomplished by storing an ordered code table of ASCII codes in the memory section 24, with each table address corresponding to the row-column coordinates of a respective display cell. The address of the code table location where the ASCII code representation of the character in the selected cell is stored is assembled from the coordinates of the cell.

Referring now to the previously described FIGS. 1, 2 and 3, and to the program flow chart diagrams of FIGS. 4 and 5, the operation of the system in adaptively scanning the display panel of a scanned display device can be understood.

The adaptive scanning technique of the preferred embodiment is performed according to the equation:

$$T_k = t + C_k(t/8) \tag{1}$$

where $T_k$ equals the kth scan transition time after the beginning of a scanning mode during row and column scanning, t equals a nominal time period of one cycle of the scan transition time signal (illustrated in FIG. 3) as established by the setting of switches SW1 and SW2 and the adjustment of potentiometer R3, $C_k$ is a constant associated with the kth scan transition time after the beginning of a scanning mode which is entered into the equation by the scanning mode control routine of the MPU 22, and k denotes the numerical position of a scan transition with respect to the beginning of the scanning mode within which it occurs.

The routine uses equation (1) to adapt the row and column scanning modes to the adjustment time of the user by successively reducing the constant $C_k$ for the first four scan transition times of the first scan cycle after initiation or selection of the row or scan mode, which effectively lengthens these scan transition times in comparison with all succeeding transition times. In the preferred embodiment, the settings of the switches SW3 and SW4, which are made by the user, are decoded by the MPU 22 to provide selected values of $C_k$ which result in scanning transition time delays according to the format of Table 1.

TABLE 1

| TRANSITION (k) | SW3:CLOSED SW4:OPEN | | SW3:OPEN SW4:OPEN | | SW4:CLOSED | |
|---|---|---|---|---|---|---|
| | $C_k$ | $T_k$ | $C_k$ | $T_k$ | $C_k$ | $T_k$ |
| 1 | $C_1=7,$ | $T_1=(15/8)t$ | 5 | $(13/8)t$ | 0 | $t$ |
| 2 | $C_2=5,$ | $T_2=(13/8)t$ | 3 | $(11/8)t$ | 0 | $t$ |
| 3 | $C_3=3,$ | $T_3=(11/8)t$ | 2 | $(10/8)t$ | 0 | $t$ |
| 4 | $C_3=2,$ | $T_4=(10/8)t$ | 1 | $(9/8)t$ | 0 | $t$ |
| $\geq 5$ | $C_k=0,$ | $T_k=t$ | 0 | $t$ | 0 | $t$ |

Thus, according to Table 1, with SW4 closed, the scanning mode control routine will introduce no increase, and all scan transition times will be equal. With SW4 open, the routine will interpret the setting of SW3 to provide an increase in each of the first four transition times of the first cycle of the row or column scan mode, with each increase being less than the preceeding one. For example, with SW3 closed and SW4 open, the first transition time, $T_1$, from activation of the first row or cell to activation of the second row or cell is $(15/8)t$, and the increase is $(7/8)t$. This relationship is illustrated in FIG. 3, wherein the frequency of the chopped waveform segment is $8/t$, and the segment comprises $(15/8)$ of the period, $t$, of the scan transition time signal waveform shown above it. The second transition time, $T_2$, from activation of the second row or cell to activation of the third is $(13/8)t$, and the increase is $(5/8)t$. The third transition time, $T_3$, from activation of the third row or cell to activation of the fourth is $(11/8)t$, and the increase is $(3/8)t$. Finally, the fourth transition time, $T_4$, is $(10/8)t$, and the increase is $(2/8)t$. For all subsequent transitions, the transition time is $t$, and there is no increase. Similarly, with SW3 and SW4 open, $T_1$ is $(13/8)t$, and the increase is $(5/8)t$, and so on.

It is evident that the increases can be varied in magnitude beyond what is shown in Table 1, simply by varying the value of $C_k$ or by altering the fraction of t contained in parenthesis by which C is multiplied in equation (1). Moreover, the diminishing increases can be provided over fewer or more than four scan transitions without departing from the principle underlying the present invention.

FIGS. 4 and 5 illustrate simplified program flow charts of a software scanning mode control routine and an INCREASE subroutine, respectively, which can be employed to control the scanning of LED matrix 43 according to the adaptive row-column scanning technique described hereinabove. Encoded machine language instructions, written by a reasonably skilled computer programmer, and appropriate for executing the software routines illustrated in FIGS. 4 and 5, may be stored in, for example, selected memory units included in the memory circuit 24 of the MPU 22. When the scanned display device is turned on, the MPU 22, in program step 50, performs any initialization tasks necessary for the program, such as flag setting, and initial configuring.

Next, in program step 51, the programmed MPU 22 initiates the row scanning format by providing I/O expander 30 with appropriate codes to switch on the electronic switch ES1 and switch off ES2, which establishes the frequency of the row and column scan transition time signal provided by the programmable timer 40, as described hereinabove. The MPU also provides a signal through the I/O expander 30 which raises the voltage on the RESET line to prevent the timer 40 from beginning operation. In program step 52, the scanning mode control program calls from memory the series of scanning signals necessary to control the LED matrix 43 in the row scanning mode, as described hereinabove. Next, the program causes the MPU 22 to output the scanning signal necessary to illuminate the first row of LEDs in the LED matrix 43. After the first row of LEDs is illuminated, the INCREASE subroutine, illustrated in FIG. 4, is called in program step 53.

In the INCREASE subroutine, the condition of the scanning mode control routine is inspected to determine whether the routine is in the confirmation mode (decision block 54). As the scanned display device has just been turned on, and the row scanning mode has been initiated, the negative exit is taken from decision block 54, and the subroutine enters decision block 55 where it inspects the condition of SW 4. Should switch SW4 be closed, the subroutine, operating in accordance with Table 1 hereinabove, determines that no increase in the first four transitions of the row or column scan mode has been selected and returns to the scanning mode control routine through program step 56, in which the MPU 22 causes the RESET signal to the programmable timer 40 to be dropped to near ground, thereby allowing the timer to begin operation.

When the INCREASE subroutine is exited, the scanning mode control routine in decision block 57 causes the MPU 22 to inspect the scan transition time signal provided by the programmable timer 40 to determine whether a change of state of the signal has occurred, indicating the need to make a scan transition on the LED matrix. The change of state of interest will be the system designer's choice; in the preferred embodiment, the MPU 22 responds to a change from the lower or "zero" level to a higher or "one" level on the scan transition signal. In the event no change has occurred, the negative exit will be followed from the decision block 57, taking the routine to decision block 58, where the condition of the selection switch 32 is tested. Assuming that the user has not closed the switch 32, indicating that the display cell he wishes to select is not in the first row, the routine will take the negative exit from decision block 58 to program step 53, and the program will progress through the INCREASE subroutine to decision block 57. Assuming that the scan transition time signal has changed state, the control routine will enter decision block 59.

As the user has not made the final selection of a display cell, which will send the scanning mode control routine into the confirmation mode, the routine follows the negative exit from decision block 59, enters decision block 60 where it inspects a delay flag, described hereinbelow, to determine whether a delay has been selected. As it has been assumed that SW4 is closed, indicating the user has not selected an increase, the delay flag will not have been set, and the negative exit from decision block 60 will be taken. The routine will then enter program step 61 where the scanning signal will be updated to cause the next row of LEDs to be optically activated, and the RESET signal to the programmable timer 40 to be raised.

In this manner, without an increase setting on switches SW3 and SW4, and without a closure of the selection switch 32, the scanning mode control program will cause the LED matrix 43 to be row scanned; in the preferred embodiment, the scanning mode control program is structured to make both the row and column scanning modes cyclic, as described hereinabove.

Once the user closes the selection switch 32, the scanning mode control routine will, at the first opportunity, take a positve exit from decision block 58 and, assuming that the row scanning mode is currently being implemented, will take the positive exit from decision block 62, initiate the column scan by production of appropriate scanning signals, and perform column scanning of the selected row in the manner described hereinabove, until the user selects a display cell by a second closure of the selection switch 32. When the scanning mode control routine is in the column mode and the selection switch 32 is closed, it will follow the positive exit from the decision block 58 and the negative exit from block 62, and enter decision block 63.

Assuming that the user has closed the selection switch 32 to select a display cell while the routine is in the column scanning mode, a positive exit will be followed from the decision block 63, and the program will move through program step 64 where the MPU 22 will provide signals by way of the I/O expander 30 to open ES1, close ES2, and raise the voltage on the RESET line. Once the routine enters the confirmation mode through program step 64, the oscillation frequency of the scan transition time signal is changed, as is described hereinabove, to the confirmation mode transition time which is determined by R4 and R5 in the circuit of the programmable timer 40. In the confirmation mode, the routine enters program step 52, and maintains the current scanning signal, which keeps the LED in the selected display cell turned on for the duration of the scan transition time signal. The routine then progresses to program step 53, calls the delay subroutine, follows the positive exit from decision block 54, lowers the RESET signal in the timer, and returns to the flow chart of FIG. 4.

While in the confirmation mode, the routine will follow the course described hereinabove until it either detects a closure of the selection switch 32 or a transition of the scan transition timing signal. In the event that the user wishes to cancel the selection before the transition signal changes state, the routine will follow the positive exit from decision block 58, the negative exit from decision block 62, and the negative exit from decision block 63, which will cause it to automatically initiate row scanning in program step 51, whereafter it follows the course described hereinabove. Without a closure of the selection switch 32, the routine will eventually detect a change of state of the transition signal in decision block 57 and enter decision block 59 whence it will take the positive exit to program step 65.

In the confirmation mode, when the scanning mode control routine enters program step 65, it causes the MPU 22 to supply to I/O expander 30 the ASCII code for the character contained in the selected display cell to a computer system, not shown, for the use described hereinabove. The routine then reenters program step 51 to automatically initiate row scanning in the manner described hereinabove.

In the operation of the invention, when the user selects a scan transition delay by leaving switch SW4 open, the INCREASE subroutine will cause the MPU 22 to control the programmable timer 40 in order to insert an added time segment into each of the first four scan transition times of the first cycle of either the row or the column scanning mode. Thus, when the subroutine enters the decision block 55 and detects that the switch SW4 is open, it follows the positive exit, entering the decision block 66, wherefrom, prior to the fifth scan transition of the first cycle of the row or column scanning mode, it will take the negative exit.

During the first cycle of the row or column scanning mode, on the first pass through the INCREASE subroutine, subsequent to activating the first row or cell, but prior to the first transition, the subroutine will pass through decision block 67, taking the negative exit as the delay flag has not been set, indicating the delay has not yet been calculated. Prior to the first transition, the subroutine will enter decision block 68, take the positive exit, and enter program step 69 where the MPU 22 will decode the setting of the switch SW3 to determine, according to Table 1, the value of $C_1$ which is necessary to calculate, using equation (1), the value of $T_1$ in program step 70.

From program step 70, the INCREASE subroutine progresses to program step 71 where the delay flag is set, indicating that the delay has been calculated, and signals are provided from the MPU 22 to the I/O expander 30 causing the voltage on the CHOP control line of the programmable timer 40 to rise, and the voltage on the RESET control line to fall. This begins the timer operating in the accelerated mode which, in the preferred embodiment, causes the scan transition time signal to oscillate at eight times its normal operating frequency, as described hereinabove. Now, when the scanning mode control routine detects a transition of the scan transition time signal in decision block 57, it will enter decision block 59 and take the negative exit therefrom to decision block 60.

With the delay flag set, the positive exit will be followed from decision block 60 and the scanning mode control routine will accumulate the number of accelerated scan transition signal changes by successive passes through decision block 72. As is apparent, each transition of the scan transition time signal with the programmable timer 40 in the CHOP mode will be equivalent to $t/8$ in the preferred embodiment of the invention illustrated in FIG. 2 and described in Table 1.

In order to provide the proper delay, the routine will compare the current count of timer transitions against the required value of $T_k$ in Table 1; thus, before the first transition and with SW3 open, $T_1 = (15/8)t$, which is equivalent to 15 transitions of the chopped scan transition time signal. In the transition from illumination of row 1 to illumination of row 2 in the first cycle of the row scanning mode, the scanning mode control routine will follow the negative exit from decision block 72 with each transition of the timer 40 in the CHOP mode, and pass back through decision block 58 and the following portions of the routine, until it has counted 15 timer transitions when SW3 is open, or 12 transitions when SW3 is closed, in either of which cases it will take the positive exit from the decision block 72. When, with the delay flag set, the routine follows the positive exit from decision block 72 indicating that the transition delay is complete, it enters program step 73, where it resets the delay flag, preparing the INCREASE subroutine for calculation of the next increased transition time, and drops the CHOP signal line voltage. Thereafter, in program step 61 the routine will change the scan control signal provided by the MPU 22 to cause the LED matrix 43 to transition to the next row or cell of the current scan mode. In the same step, the routine will cause the RESET signal line of the programmable timer 40 to rise, thus disabling the timer until the routine next passes through the CALL INCREASE program step 53.

In this manner, the INCREASE subroutine illustrated in FIG. 4 will introduce successively decreasing amounts of time into the first four scan transtiion times of the first cycle of either the row or column scanning modes in accordance with Table 1, which embodies the principle of the invention. Once the fourth transition has been made, after which, in the preferred embodiment no increase is inserted in the scan transition time, the INCREASE subroutine will pass through the positive exit of decision block 66, following which it will perform any steps necessary to deactivate the increase portion of the subroutine. Then, in program step 56, it will cause the MPU 22 to drop the voltage level on the RESET control line of the programmable timer 40. Thereafter, the subroutine will exit to the scanning mode control program.

The Applicants have found that, while the adaptive technique described hereinabove can be implemented for any scan transition time, it is most effectively used in transition times ranging from less than 0.1 seconds to approximately 2.0 seconds, which, in the Applicants' experience, is the range within which most users can operate a scanned display device.

It is obvious that the values of $C_k$ in Table 1 may be adjusted to provide increases of any desired magnitude in the selected scan transitions. Moreover, the increases could be made independent of the selected scan transition time by changing equation (1) to:

$$T_k = t + C_k \quad (2)$$

where $C_k$ is a constant associated with the kth transition time.

However, the Applicants have found that the adaptive scan technique works optimally when the increases are successively decreasing and are proportional to the scan transition time signal duration, t, in accordance with Table 1 and equation (1).

As used herein, the term "multi-mode scanning technique" does not refer solely to the row-column scanning technique of the preferred embodiment. Many other scanning techniques comprise a plurality of modes between which the user can selectively switch. One example of another multi-mode scanning technique is the directed scan wherein adjacent display cells of a display panel are activated in such a manner as to trace a line or path, such as a horizontal, vertical, or diagonal line, on the panel. The user operates a selection switch or joystick to change the direction of the trace. Each linear path can be considered a scanning mode, and the Applicants have observed that a user adjustment time attends the initiation of a mode in this technique. Consequently, the apparatus and method of the invention can be applied in the directed scanning technique, as well as in other scanning techniques which entail at least one initiation of one scanning mode.

Furthermore, it is evident that the substance of the invention may be applied in scanned display systems which are other than optically activated. For example, it is known that blind persons who are also communicatively handicapped can use scanned communcation aids having display cells which are activated by auditory or tactile means. Such displays may be scanned by techniques corresponding to those described or referenced herein, and the Applicants' invention can be implemented in the apparatus and methods used to control the scanning of those devices.

Next, with reference to the preferred embodiment described hereinabove, a person skilled in the art would see that optical activation of the embodiment can also refer to extinguishing illumination, as in the case where the display panel cells are initially illuminated and the scanning technique is implemented by systematically turning off the illuminated cells. Also, the operation of the timing circuit of the embodiment may be reproduced within the control program of the MPU 22 as a timing routine, with the consequence of reducing the total hardware requirements of the embodiment.

Finally, the invention is in no way restricted to use in communication aids for the handicapped. It is evident that an adaptively scanned display of the type described herein can have great utility as an access device for a computer system, corresponding in many ways to a computer keyboard, and can be used for this purpose by non-handicapped persons who can also be assisted by the technique of the invention. In this vein, it is also evident that the scanning control apparatus 19 can comprise elements of the computer system with which an access device or communication aid including an embodiment of the invention may be used. At the same time, it is further evident that the display panel 20 can be reproduced on a CRT display device under the control of a graphics display routine in the computer system. Manifestly, then, the whole apparatus and method of the invention can be absorbed into the computer system in association with which it is described above.

Although a variety of different instruction steps might be used in programming the MPU 22 of the preferred embodiment to implement its control of the optical activation of the rows and columns of the LED matrix 43, and to cause it to produce the ASCII code corresponding to the communication element contained in the selected display cell during the confirmation mode, the instruction sequences listed in Table II below are illustrative of a set of instructions which are suitable for scanning a 4×4 matrix according to the row-column scanning technique described hereinabove and may be easily expanded to scanning an 8×8 matrix. This instruction set will be understood by those skilled in the art, when they refer to the MCS-48 TM User's Manual, referenced hereinabove, to produce scanning signals which selectively enable the source and sink amplifiers 45 and 46 through the I/O expander 28, and signals which enable I/O expander 30 to provide ASCII codes during the confirmation mode.

In the sequences listed below, a time delay sequence TIMDLY is called instead of INCREASE. The TIMDLY provides a non-lengthened scan transition time which is suitable for demonstrating how row-column scanning can be implemented. In addition, the instruction sequence for providing the ASCII code addresses a memory module contained in the memory circuit 24 which may hold, for example, a microcode comprising an array of ASCII code entries which correspond to the communications elements contained in the display cells of the communication aid. The CODE instruction sequence provides a means for mapping between the microcode and the display cells by addressing a microcode location based upon the scanning signal provided to I/O expander 28 to activate the selected display cell in the confirmation mode. The mapping comprises a panel location word containing the row-column coordinates of the selected cell. The entry stored at the calculated memory location is provided through I/O expander 30.

TABLE II

| | | | |
|---|---|---|---|
| | | This sequence will implement row scanning. | |
| | CLR | F1 | (Temp flag) initialize to row 1 |
| ROW: | ANL | P2,#0EFH | Select I/O expander 28 |
| | ORL | P2,#0E0H | display panel interface |
| | MOV | A,#0FFH | Turn on source amplifier of column 1 to 4 |
| | MOVD | P4,A | |
| | JF1 | ROWX | Jump on F1 flag. (Jump if set) |
| | MOV | R4,#00H | Always start with row 1. |
| | CPL | F1 | |
| ROWX: | MOV | A,R4 | Turn on sink amplifier of proper row |
| | MOVD | P6,A | As a result all row LED's turn on |
| | MOV | R1,#80H | Hold time delay (It comes from timing network) |
| | CALL | TIMDLY | For an experiment it can be a fixed 2 sec hold/row |
| | INC | R4 | Calculate the next row |
| | MOV | A,R4 | |
| | XRL | A,#04H | Test for row 5 |
| | JNZ | ROWY | Jump not row 5 |
| | CLR | F1 | If row=5 reset to row 1 |
| ROWY: | JMP | ROW | Continue |
| | | This sequence will implement column scanning. | |
| | CLR | F1 | |
| COL: | ANL | P2,#0EEH | Select I/O expander 28 |
| | ORL | P2,#0E0H | |
| | MOV | A,#01H | Turn the desired row (sink) amplifier on. |
| | MOVD | P6,A | Assume row 2 |
| | JF1 | COLX | Jump on F1 flag (Jump is set) |
| | MOV | R4,#00H | Always start with col 1. R4 holds location word. |
| | CPL | F1 | |
| COLX: | MOV | A,R4 | Only turn on the source amplifier for proper col |
| | MOVD | P4,A | As a result only one LED is on |
| | MOV | R1,#80H | Hold the LED on (Time delay) |
| | CALL | TIMDLY | |
| | INC | R4 | Calculate the next col, increment location word. |
| | XRL | A,#04H | Test for col 5 |
| | JNZ | COLY | Jump not col 5 |
| | CLR | F1 | If col=5 reset to col 1 |
| COLY: | JMP | COL | Continue |
| | | This sequence will implement the confirmation mode. | |
| CONF: | CLR | A | |
| | MOVD | P4,A | Turn source amplifier off |
| | MOV | R1,#10H | |
| | CALL | TIMDLY | Hold time (Time delay) |
| | MOV | A,R4 | |
| | MOVD | P4,A | Turn source amplifier on |
| | MOV | R1,#10H | |
| | CALL | TIMDLY | Hold time (Time delay) |
| | JMP | CONF | Continue |
| | | This sequence will implement TIMDLY. | |
| TIMDLY: | CLR | A | Loop to spend time |
| | MOV | T,A | Clear timer register. |
| T1: | STRT | T | Start timer |
| T2: | JTF | T3 | Jump to T3 when timer is finished |
| | JMP | T2 | Else wait till it is (20 ms loop) |
| T3: | STOP | TCNT | |
| | DJNZ | R1,T1 | Decrement loop counter (R1) Jump not=0 |
| | RET | | |
| | | This sequence will implement CODE. | |
| STROB: | ANL | P2,#0DFH | Select I/O expander 30 |
| | ORL | P2,#0D0H | |

TABLE II-continued

| | | |
|---|---|---|
| MOV | A,R4 | R4 holds location word. |
| MOVP3 | A,@A | Give address to table to get the value |
| MOVD | P6,A | Put first 4 bits on the output ports P60-P63 of I/O expander 30 |
| SWAP | A | Change the place of the nibbles. Put second 4 bits on the output ports P70-P73 of I/O expander 30. Last bit to reset computer. |
| MOVD | P7,A | |
| NOP | | |
| NOP | | |
| NOP | | 10 micro-second delay to let data bus stabilize |
| NOP | | |
| ORL | P1,#10H | Put strobe line high |
| NOP | | |
| NOP | | |
| NOP | | Hold strobe high for 10 micro-seconds |
| NOP | | |
| ANL | P1,#0EFH | Bring strobe line back down |

The MPU 22 also provides a code validation indicator signal as illustrated in FIG. 2. This indicator may be used by a computer system as a strobe to prepare I/O circuitry for reception of the code.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An input device controllable by a user for scanning a display, said display having a plurality of individual display cells, comprising:
   (a) switch means actuable by said user for generating a control signal;
   (b) scanning means coupled to said display means and receiving said control signal from said switch means, said scanning means activating said display cells according to a plurality of different predetermined scanning modes, each of said scanning modes comprising a plurality of scan transitions, each said scan transition comprising successive activations of at least a respective pair of said display cells, said scanning means including means for changing from one of said scanning modes to another of said scanning modes; and
   (c) timing means for establishing predetermined scan transition times between said successive activations and for automatically causing a preselected number of said scan transition times to be longer near the beginning of a scanning mode than near the end thereof in response to a change from one of said scanning modes to another of said scanning modes.

2. The apparatus of claim 1 wherein said scanning means includes said timing means.

3. The apparatus of claim 1 wherein said display means is an optical display means.

4. The apparatus of claim 1 wherein said preselected scan transition times include the first scan transition time following the beginning of a respective one of said scanning modes.

5. The apparatus of claim 1 wherein said preselected transition times are unequal and, beginning with the second of said preselected times, each of said preselected scan transition times is shorter than the preceeding preselected scan transition time.

6. The apparatus of claim 4 wherein all scan transition times following said preselected scan transition times are substantially equivalent.

7. The apparatus of claim 5 wherein all scan transition times following said preselected scan transition times are substantially equivalent.

8. An input device controllable by a user for scanning a display of a computer access device or the like, said display having a plurality of individual display cells, comprising:
(a) switch means actuable by said user for generating a control signal;
(b) scanning means coupled to said display means and receiving said control signal from said switch means, said scanning means activating said display cells according to a plurality of different predetermined scanning modes, each of said scanning modes comprising a plurality of scan transitions, each said scan transitions comprising successive activations of at least a respective pair of said display cells, said scanning means including means for changing from one of said scanning modes to another of said scanning modes; and
(c) timing means for establishing a predetermined scan transition time between each said successive activation and for lengthening a preselected number of said scan transition times, said preselected number of scan transition times occurring nearer the beginning of a scanning mode than near the end thereof, said timing means automatically lengthening said preselected number of scan transition times in response to a change from one of said scanning modes to another of said scanning modes.

9. The apparatus of claim 8 wherein said scanning means includes said timing means.

10. The apparatus of claim 8 wherein said preselected number of scan transition times includes the first scan transition time following the beginning of a scanning mode.

11. The apparatus of claim 8 wherein said preselected number of scan transition times are of unequal duration, and, beginning with the second of said preselected scan transition times, each of said preselected scan transition times is shorter than the preceeding preselected scan transition time.

12. The apparatus of claim 11 wherein the time difference between each of said preselected scan transition times and said predetermined scan transition time is proportional to said predetermined scan transition time.

13. The apparatus of claim 11 wherein said predetermined scan transition time, t, is contained within the range defined by $$2 \text{ seconds} \geq t \geq 0.1 \text{ seconds},$$

and the magnitudes of said preselected scan transition times are contained within the range R defined by $R=(2t, 9t/8)$.

14. A method for controlling by an input device the scanning operation of a display having a plurality of individual display cells, said method comprising the steps of:
(a) generating a control signal through the actuation of a switch means operable by said user, said control signal activating said display cells to produce a predetermined scanning mode of said display, said predetermined scanning mode comprising a plurality of scan transitions, each said scan transition comprising successive activations of at least a pair of said display cells;
(b) establishing predetermined scan transition times between said successive display cell activations; and
(c) causing a preselected number of said scan transition times to be longer near the beginning of said respective scanning mode than near the end thereof.

15. The method of claim 14 further comprising, after step (c), changing said predetermined scanning mode to another predetermined scanning mode, and, thereafter, performing step (c).

* * * * *

UNITED STATES PATENT AND TRADEMARK OFFICE
CERTIFICATE OF CORRECTION

PATENT NO.   :   4,558,315

DATED        :   December 10, 1985

INVENTOR(S)  :   Lawrence H. Weiss et al

It is certified that error appears in the above-identified patent and that said Letters Patent is hereby corrected as shown below:

Col. 8, line 13     Change "sca" to --scan--

Col. 11, in Table 1  Change "$C_3 = 2$" to --$C_4 = 2$--

Col. 19, line 23    Change "transitions" to --transition--

Signed and Sealed this

Thirtieth Day of September 1986

[SEAL]

Attest:

DONALD J. QUIGG

Attesting Officer

Commissioner of Patents and Trademarks